(12) United States Patent
Sakurai et al.

(10) Patent No.: US 6,504,345 B2
(45) Date of Patent: Jan. 7, 2003

(54) CHARGE/DISCHARGE CONTROL CIRCUIT AND CHARGING TYPE POWER SUPPLY DEVICE

(75) Inventors: Atsushi Sakurai, Chiba (JP); Koichi Yamasaki, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/854,345

(22) Filed: May 11, 2001

(65) Prior Publication Data

US 2001/0052759 A1 Dec. 20, 2001

(30) Foreign Application Priority Data

May 12, 2000 (JP) .................................. 2000-139310
Feb. 20, 2001 (JP) .................................. 2001-044067

(51) Int. Cl.$^7$ ................................................ H02J 7/14
(52) U.S. Cl. ........................................ 320/162; 320/134
(58) Field of Search ................................ 320/160, 162, 320/132, 134, 136

(56) References Cited

U.S. PATENT DOCUMENTS

| 5,959,436 A | * | 9/1999 | Takashina et al. | .......... 320/134 |
| 5,990,663 A | * | 11/1999 | Mukainakano | .............. 320/134 |
| 6,160,381 A | * | 12/2000 | Peterzell | ...................... 320/134 |
| 6,396,246 B2 | * | 5/2002 | Haraguchi et al. | .......... 320/134 |

* cited by examiner

Primary Examiner—Gregory J. Toatley, Jr.
(74) Attorney, Agent, or Firm—Adams & Wilks (57) ABSTRACT

A charge/discharge control circuit has a circuit structure having another return detection voltage different from a detection voltage for detecting an over-current when returning from an over-current state to a normal state. With the structure, the charge/discharge control circuit surely returns from the over-current state to the normal state even if a load of 1 MΩ or less in a low impedance is opened.

19 Claims, 10 Drawing Sheets

CHARGE/DISCHARGE CONTROL CIRCUIT AND CHARGING TYPE POWER SUPPLY DEVICE

BACKGROUND OF THE INVENTION

1. Field of the Invention

The present invention relates to a charge/discharge control circuit which is capable of controlling the charge/discharge of a secondary battery by the on/off operation of a switching circuit and a charging type power supply circuit using the circuit.

2. Description of the Related Art

Figure 2:
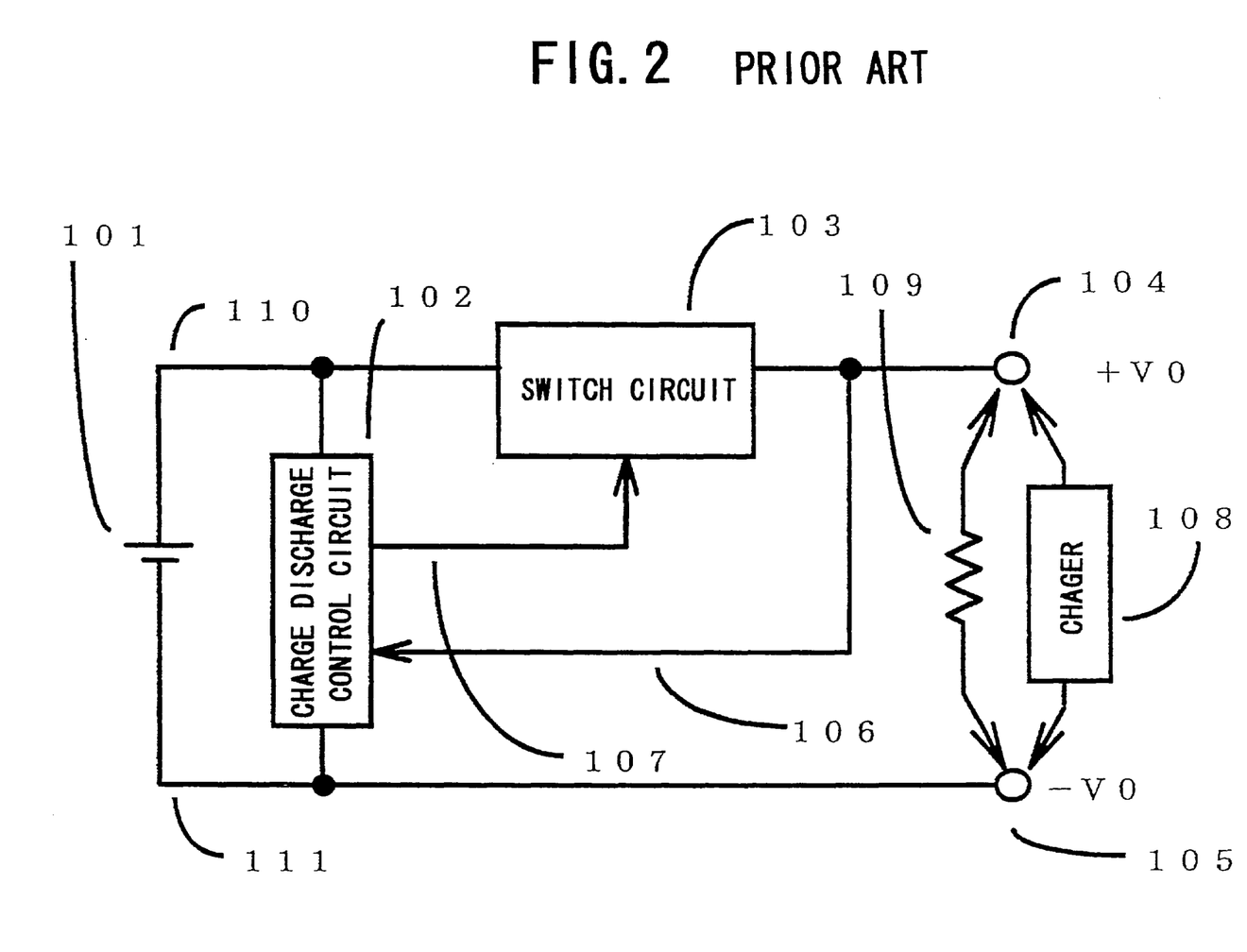
FIG. 2 is an explanatory diagram showing a circuit block example of a conventional charging type power supply device.

As a conventional charging type power supply device formed of a secondary battery, there has been known a power supply device shown by a circuit block diagram of FIG. 2. This structure is disclosed in, for example, "charging type power supply device" of Japanese Patent Application Laid-Open No. Hei 4-75430. That is, a secondary battery 101 is connected to an external terminal −V0 105 or +V0 104 through a switching circuit 103. A charge/discharge control circuit 102 is also connected in parallel with the secondary battery 101.

The charge/discharge control circuit 102 has a function of detecting a voltage across a secondary battery 101. In the case where the secondary battery 101 is in an overcharged state (a state where the battery voltage is higher than a given voltage value; hereinafter referred to as "overcharge protecting state") or in an overdischarged state (a state where the battery voltage is lower than the given voltage value; hereinafter referred to as "overdischarge protecting state"), a signal is outputted from the charge/discharge control circuit 102 so that the switching circuit 103 turns off. Also, if discharging operation stops when the external terminal +V0 104 reaches a certain voltage, it is possible to limit a current that flows in the switching circuit 103. That is, the discharging operation can stop (over-current control) when an excessive current flows in the switching circuit 103. Hereinafter, this state is referred to as "over-current protecting state".

Figure 3:
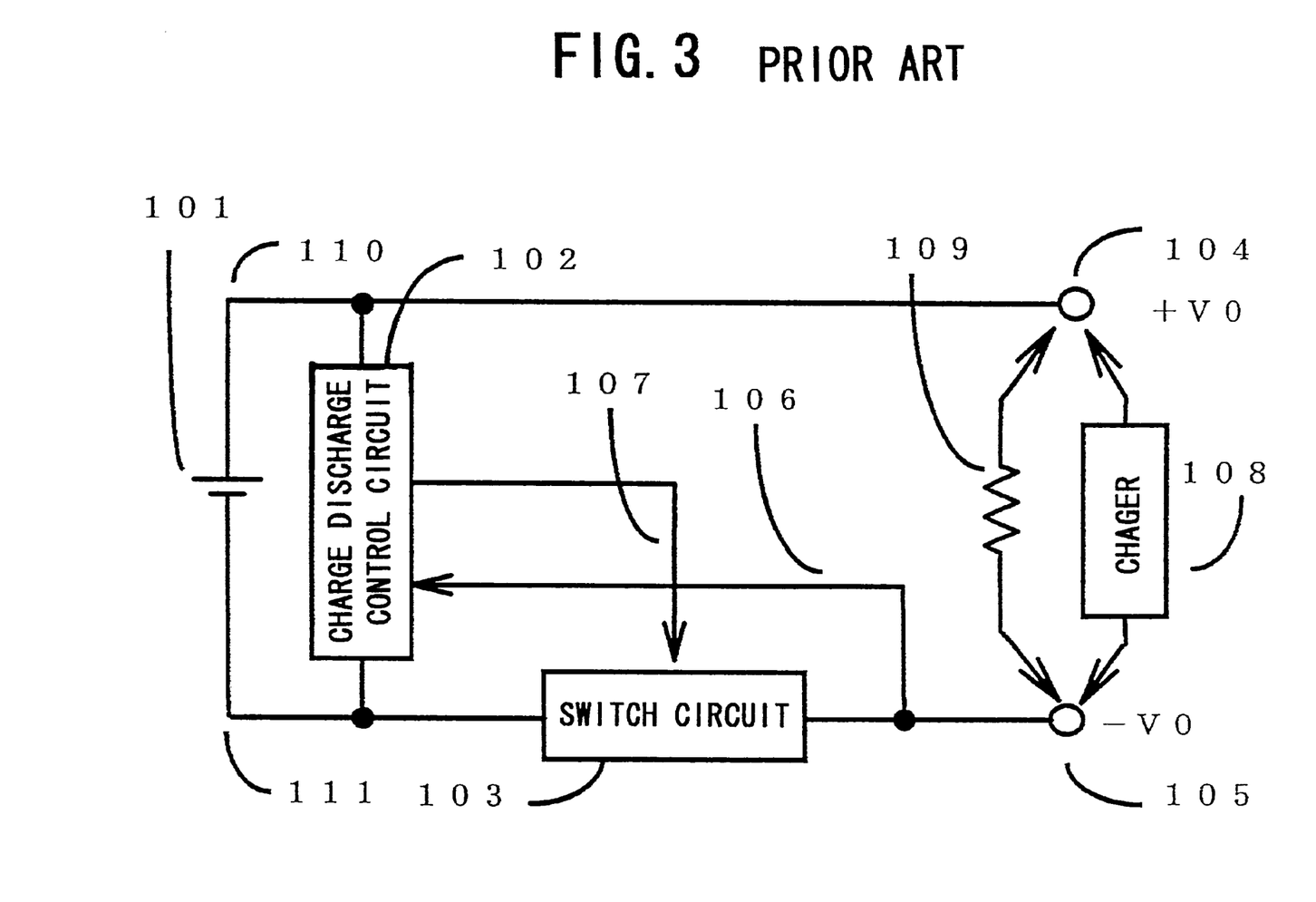
FIG. 3 is an explanatory diagram showing another circuit block example of a conventional charging type.power supply device.

As another example of the conventional charging type power supply device formed of a secondary battery, there has been also known a power supply device shown by a circuit block diagram of FIG. 3. This circuit is designed such that the switching circuit 103 shown in FIG. 2 is connected in series to a negative pole 111 of the secondary battery.

Figure 4:
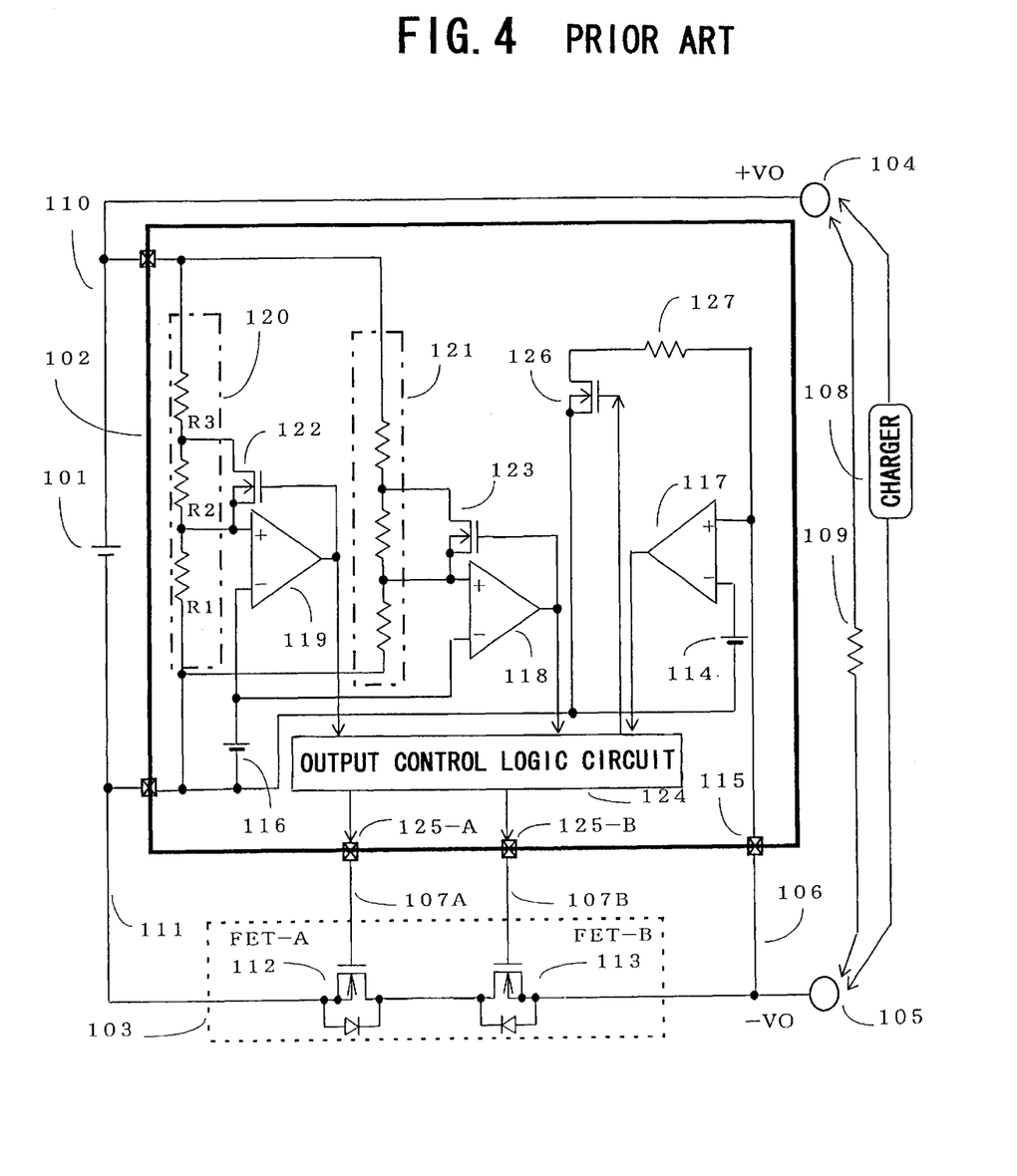
FIG. 4 is an explanatory diagram showing still another circuit block example of a conventional charging type power supply device.

FIG. 4 shows a conventional example of a circuit block diagram of a specific charge/discharge control circuit. A secondary battery 101 is connected to an external terminal −V0 105 through a switching circuit 103. The switching circuit 103 is made up of two n-channel FETS. A voltage across the secondary battery 101 is detected by a charge/discharge control circuit 102. The charge/discharge control circuit 102 is made up of an overcharge detection comparator 119, an overdischarge detection comparator 118, an over-current detection comparator 117, a reference voltage circuit A 116, a reference voltage circuit B 114, a voltage divider circuit A 120, a voltage divider circuit B 121, an output logic control circuit 124, etc. The charge/discharge control circuit 102 is connected to the switching circuit 103 by signal lines 107A and 107B to send out an on/off signal of the switching circuit 1039 A charger 108 for charging the secondary battery 101 and a device (a load viewed from the secondary battery) drivable by the secondary battery 101 are connected between the external terminal +V0 104 and −V0 105. An FET-A 112 and an FET-B 113 are connected in series to the external terminal −V0 105 or +V0 104.

The overcharge detection comparator 119 and the overdischarge detection comparator 118 have a function of comparing the voltage across the secondary battery 101 with the voltage across the reference voltage circuit A 116. Since the output logic control circuit 124 sends out a signal to the terminals 125A and 125B in accordance with the outputs of the respective comparators 119 and 118, the gate voltages of the respective FETs vary in accordance with the respective states so as to turn on/off the charging and discharging operation with respect to the secondary battery. For example, in the overcharge state, the plus input terminal voltage of the overcharge detection comparator 119 becomes higher than the reference voltage A 116, and the output of the comparator 119 is inverted from low to high. When the output signal is inputted to the output logic control circuit 124, the gate voltage of the FET-B 113 in the switching circuit changes from high to low. As a result, the discharge current does not flow in the secondary battery 101, to thereby stop the charging operation.

The over-current detection comparator 117 compares the external terminal −V0 105 with the voltage across the reference voltage circuit B 114 and outputs a signal in accordance with respective states to the output logic control circuit 124. In the over-current protecting state, the output logic control circuit 124 sends out a signal to the FET-A 112 so as to stop the discharging operation while sending out a signal to the FET-C 126s, to thereby pull down the external terminal −V0 105 by a resistor 127. when the load 109 is out of the over-current protecting state after the detection of the over-current, the pull down becomes necessary to stabilize the external terminal −V0 105 to the voltage of the reference voltage B 114 or lower and return the state to a normal state.

Although it is possible to realize a switch using one FET instead of the above switching circuit, it is necessary to change the gate potential of the FET as well as the substrate potential in order to achieve the above. If the above change is not made, because the source potential of the FET can be made higher than the drain potential, the charge/discharge control described above is impossible. At present, it is general to control the charge/discharge by two FETS.

However, in the charge/discharge control circuit thus structured, when the load is out of the over-current protecting state and the charge/discharge control circuit returns to the normal state, there arise the following drawbacks which will be described with reference to FIG. 4.

In order that the charge/discharge control circuit is automatically restored when the load 109 is out of the over-current protecting state, it is necessary that the external terminal −V0 105 becomes a voltage Va of the reference voltage B 114 or lower. To achieve this, an open-circuit impedance when the load is out of the over-current protecting state must be a constant value (Ra) or more with respect to the resistor 127 (Rb). If the secondary battery 101 is Vb, Ra can be represented by the following expression.

$$Ra > Rb(Vb/Va - 1) \tag{1}$$

There is known that Vb is generally set to about 3.5 V during the normal operation. In the case where the charge/discharge control device is formed of a semiconductor integrated circuit, since the potential of the external terminal −V0 105 becomes lower than the potential of the negative pole 111 of the secondary battery when the charger 108 is connected to the charge/discharge control device, and a current flows through the resistor 127 (Rb) from the drain of the FET-C 126, Rb is generally set to about 100 KΩ in order to limit that current. Va is generally set to about 0.1 V which is set on the basis of the on resistances of the FET-A 112 and the FET-B 113 and currents flowing therein.

If the above-mentioned values are inputted to the expression (1), Ra is represented as follows:

$$Ra > 100\ K\Omega(3.5\ V/0.1-1) = 3.4\ M\Omega$$

There is the possibility that the actual open-circuit impedance becomes 1 MΩ or less according to the characteristics of such as the mounted substrate, and the charge/discharge control circuit may not return to the normal state merely when the load is out of the over-current protecting state.

SUMMARY OF THE INVENTION

Therefore, an object of the present invention is to solve the above problem.

In order to achieve the above object, according to the present invention, there is provided a charge/discharge control circuit having another return detection voltage different from a detection voltage for detecting an over-current when the charging type power supply device returns to a normal state from an over-current state.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

Figure 1:
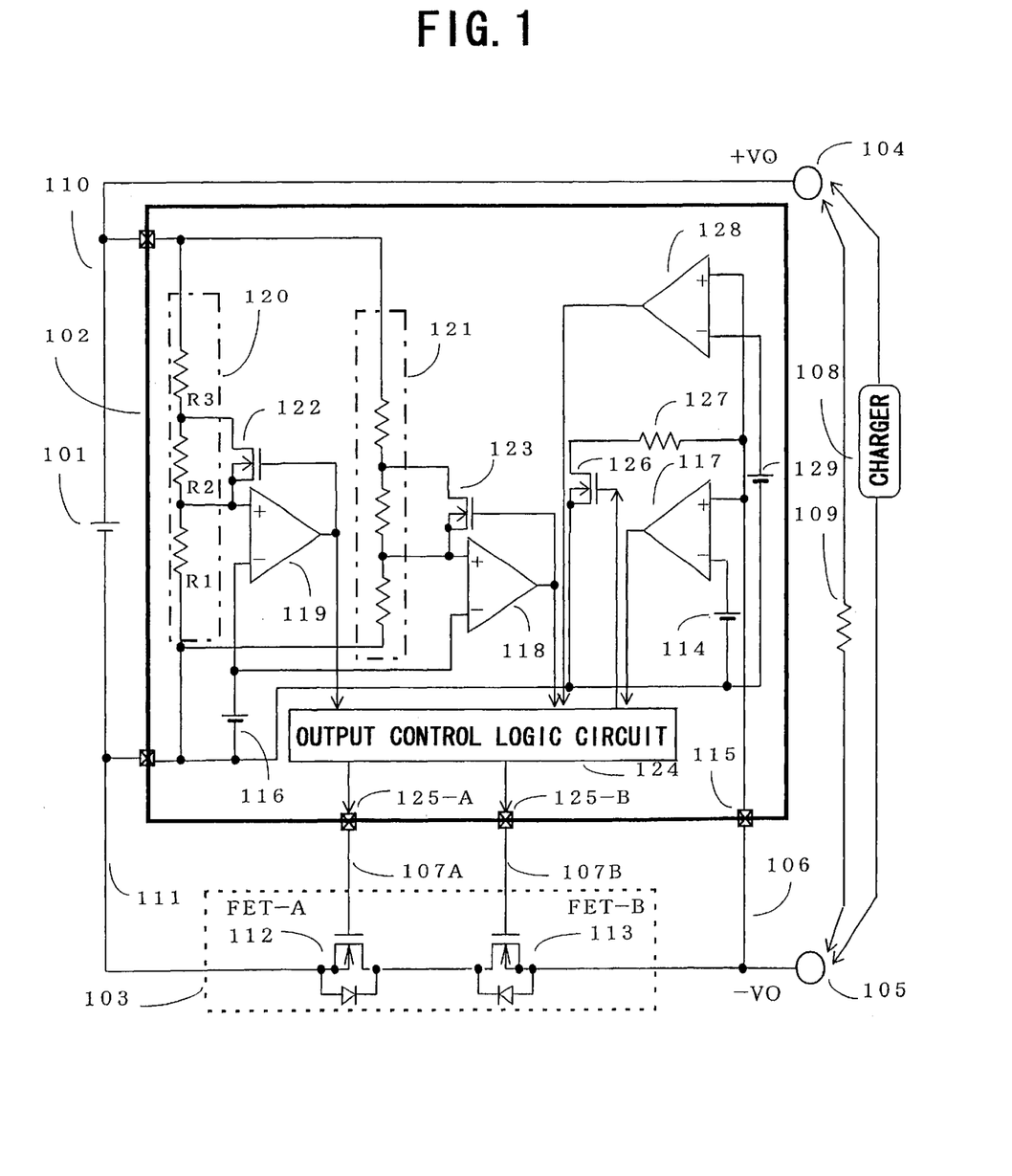
FIG. 1 is an explanatory diagram showing a circuit block example of a charging type power supply device in accordance with the present invention.

FIG. 1 is an explanatory diagram showing a circuit block example of a charging type power supply device in accordance with the present invention.

In a circuit shown in FIG. 1, an over-current return detection comparator 128 and a reference voltage C 129 are added to the circuit shown in FIG. 4. The reference voltage C 129 is set to a voltage Vc higher than the reference voltage B 114. When the over-current detection comparator 117 detects an over-current, the over-current return detection comparator 128 is in a return detection state, and the FET-A 112 is not turned on by the output logic control circuit 124 until the overcurrent return detection comparator 128 is inversed so as not to malfunction. Likewise, the FET-A 112 is not turned off until the over-current detection comparator 117 is inversed at the time of the over-current return. In this case, the open-circuit impedance Ra is represented as follows if Vc is 1 V in the expression (1):

$$Ra > 100\ K\Omega(3.5\ V/1\ V-1) = 0.25\ M\Omega$$

In this situation, the voltage at the over-current detection terminal 115, that is, a return voltage from the over-current detection is 1 V.

As described above, because the over-current detection voltage is 0.1 V whereas the return voltage from the over-current detection is 1 V, even if the load open-circuit impedance is 1 MΩ or less, it is apparent that the charge/discharge control device surely returns from the over-current state to the normal state.

Figure 5:
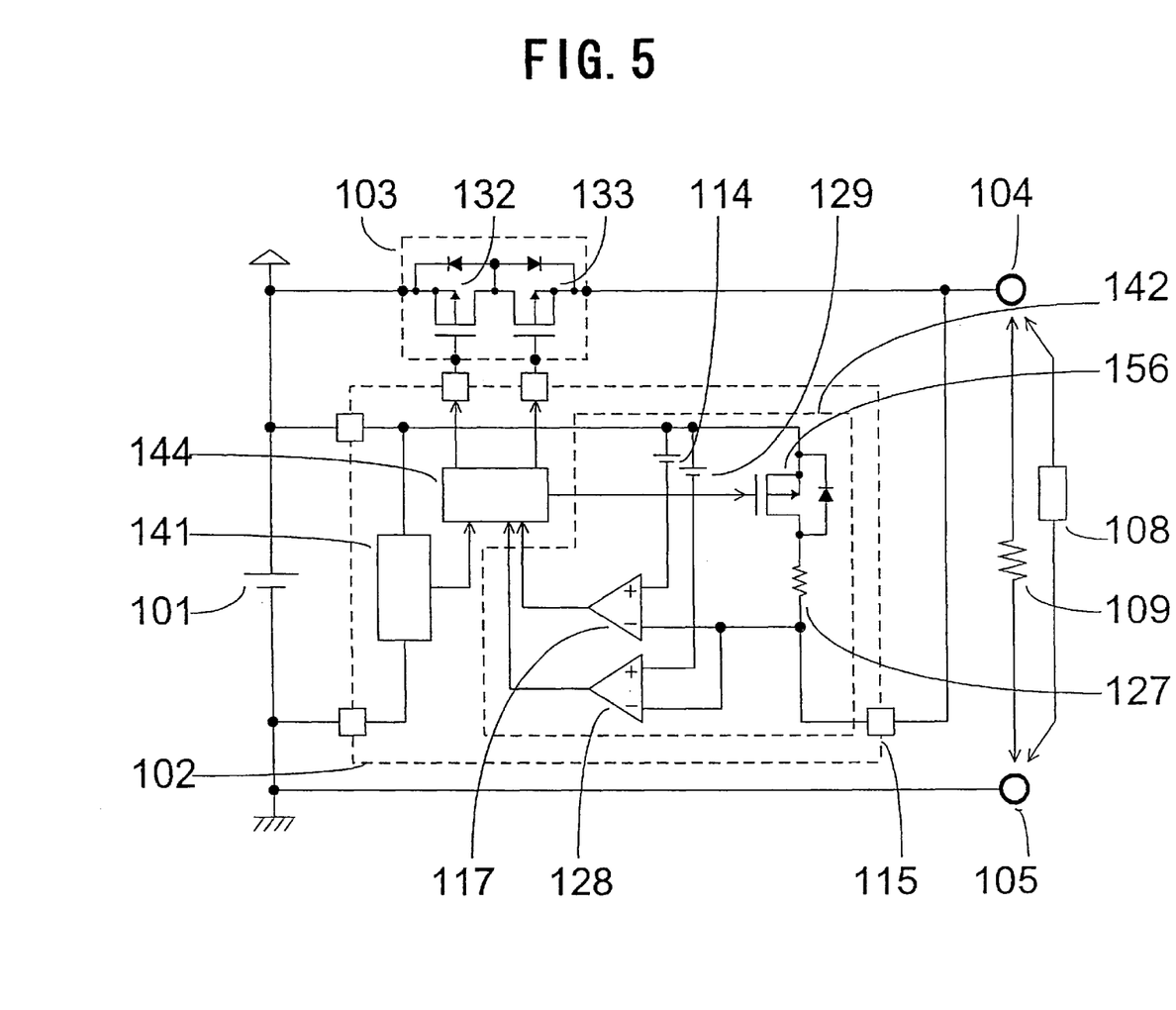
FIG. 5 is an explanatory diagram showing another circuit block example of a charging type power supply device in accordance with the present invention.

FIG. 5 is an explanatory diagram showing another circuit block example of a charging type power supply device in accordance with the present invention.

Differences from the circuit shown in FIG. 1 reside in that the switching circuit 103 is made up of an FET-D 132 and an FET-E 133 which are p-channel FETS, and the structure of the charge/discharge control circuit 102 is varied as occasion demands so as to control the switching circuit 103 formed of the p-channel FETS. An overcharge detection comparator 119, an overdischarge detection comparator 118, a reference voltage circuit A 116, a voltage divider circuit A 120, a voltage divider circuit B 121, a hysteresis circuit A 122 and a hysteresis circuit B 123 are formed together into an over-charge/discharge detecting circuit 141.

The over-current detecting circuit 142 is identical in operation with the circuit shown in FIG. 1 except that a reference is changed to the positive voltage side of the secondary battery 101. The over-current detection comparator 117 compares the external terminal +V0 104 with the voltage of the reference voltage B 114 and outputs a signal to the output logic control circuit 144 in accordance with the respective states. In the over-current protecting state, the output logic control circuit 144 sends out a signal to the FET-D 132 so as to stop the discharging operation while sending out a signal to the FET-F 156, to thereby pull up the external terminal +V0 104 by a resistor 127. When the load 109 is out of the over-current protecting state after the detection of the over-current, the pull down becomes necessary to stabilize the external terminal +V0 104 to the voltage of the reference voltage B 114 or lower and to return the state to a normal state.

The reference voltage C 129 is set to a voltage Vc higher than the reference voltage B 114. When the over-current detection comparator 117 detects over-current, the over-current return detection comparator 128 is in a return detection state, and the FET-D 132 is not turned on by the output logic control circuit 144 until the over-current return detection comparator 128 is inversed so as not to malfunction. Likewise, the FET-D 132 is not turned off until the over-current detection comparator 117 is inversed at the time of the over-current return, in this case, the open-circuit impedance Ra is represented in the same manner as the expression (1), and Ra is represented as in FIG. 1, by using the above values of Rb, Vb and Vc.

$$Ra > 100\ K\Omega(3.5\ V/1\ V-1) = 0.25\ M\Omega$$

In this situation, the voltage at the over-current detection terminal 115, that is, a return voltage from the over-current detection is 3.5 to 1 V.

As described above, because the over-current detection voltage is 3.5 to 0.1 V whereas the return voltage from the over-current detection is 3.5 to 1 V, even if the load open-circuit impedance is 1 MΩ or less, it is apparent that the charge/discharge control device surely returns from the over-current state to the normal state.

As described above, even in the case where the switching circuit 103 is made up of the p-channel FETs, it is apparent that entirely the same. operation is conducted.

Figure 6:
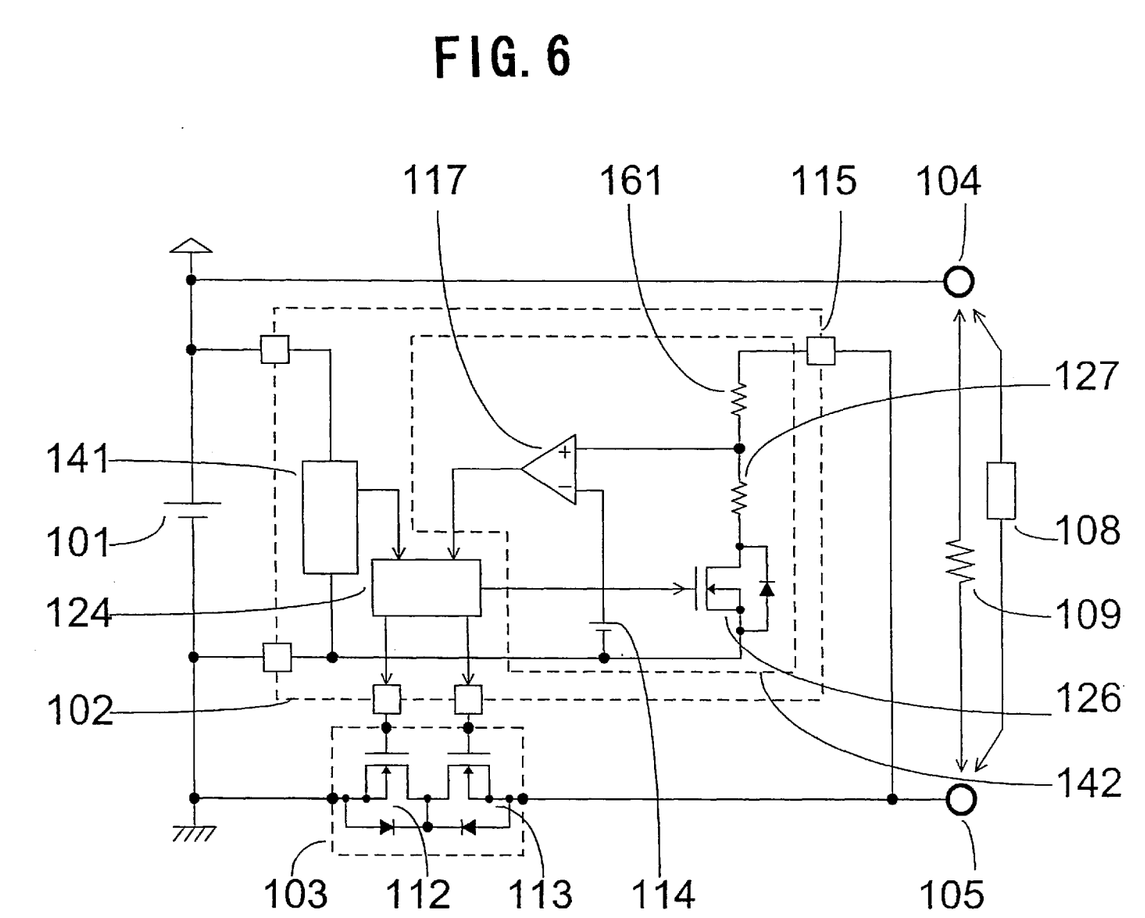
FIG. 6 is an explanatory diagram showing still another circuit block example of a charging type power supply device in accordance with the present invention.

FIG. 6 is an explanatory diagram showing another circuit block example of a charging type power supply device in accordance with the present invention.

The circuit of FIG. 6 adds a resistor 161 to the circuit of FIG. 4. The resistor 161 is connected between the over-current detection terminal 115 and an input of the over-current detection comparator 117 as well as the resistor 127. In the case of detecting the over-current, since the FET-C 126 is off, the over-current is detected when the over-current detection terminal 115 becomes the potential of the reference voltage B 114 as in FIG. 4. on the other hand, in the case of returning from the over-current detection, since the FET-C126 is on, the charge/discharge control device returns when the potential of the over-current detection terminal 115 is higher than the reference voltage B 114.

Assuming that the open-circuit impedance when the load is out is Ra, the resistance of the resistor 127 is Rb, the resistance of the resistor 161 is Rc, if the voltage of the reference voltage B 114 is Va and the voltage of the secondary battery 101 is Vb, Ra can be represented by the following expression.

$$Ra > Rb(Vb/Va - 1) - Rc \qquad (2)$$

In this situation, the voltage of the over-current detection terminal 115, that is, the return voltage Vd from the over-current detection is represented as follows:

$$Vd < (Rb+Rc)/Rb * Va \qquad (22)$$

In this expression, for example, assuming that Rb=10 KΩ, Rc=90 KΩ, Va=0.1 V and Vb=3.5 V, $$Ra > 10\ K\Omega(3.5\ V/0.1\ V-1) - 90\ K\Omega = 0.25\ M\Omega$$

$$Vd < (10\ K\Omega + 90\ K\Omega)/10\ K\Omega * 0.1\ V = 1\ V$$

As described above, because the over-current detection voltage is 0.1 V whereas the return voltage from the over-current detection is 1 V, even if the load open-circuit impedance is 1 MΩ or less, it is apparent that the charge/discharge control device surely returns from the over-current state to the normal state.

Also, because of Rb+Rc=100 KΩ, the input impedance of the over-current detection terminal 115 is identical with that in FIG. 4. Incidentally, since Rb and Rc can be freely set, the open-circuit impedance necessary to return from the over-current detection can be freely set in accordance with the intended use.

Figure 7:
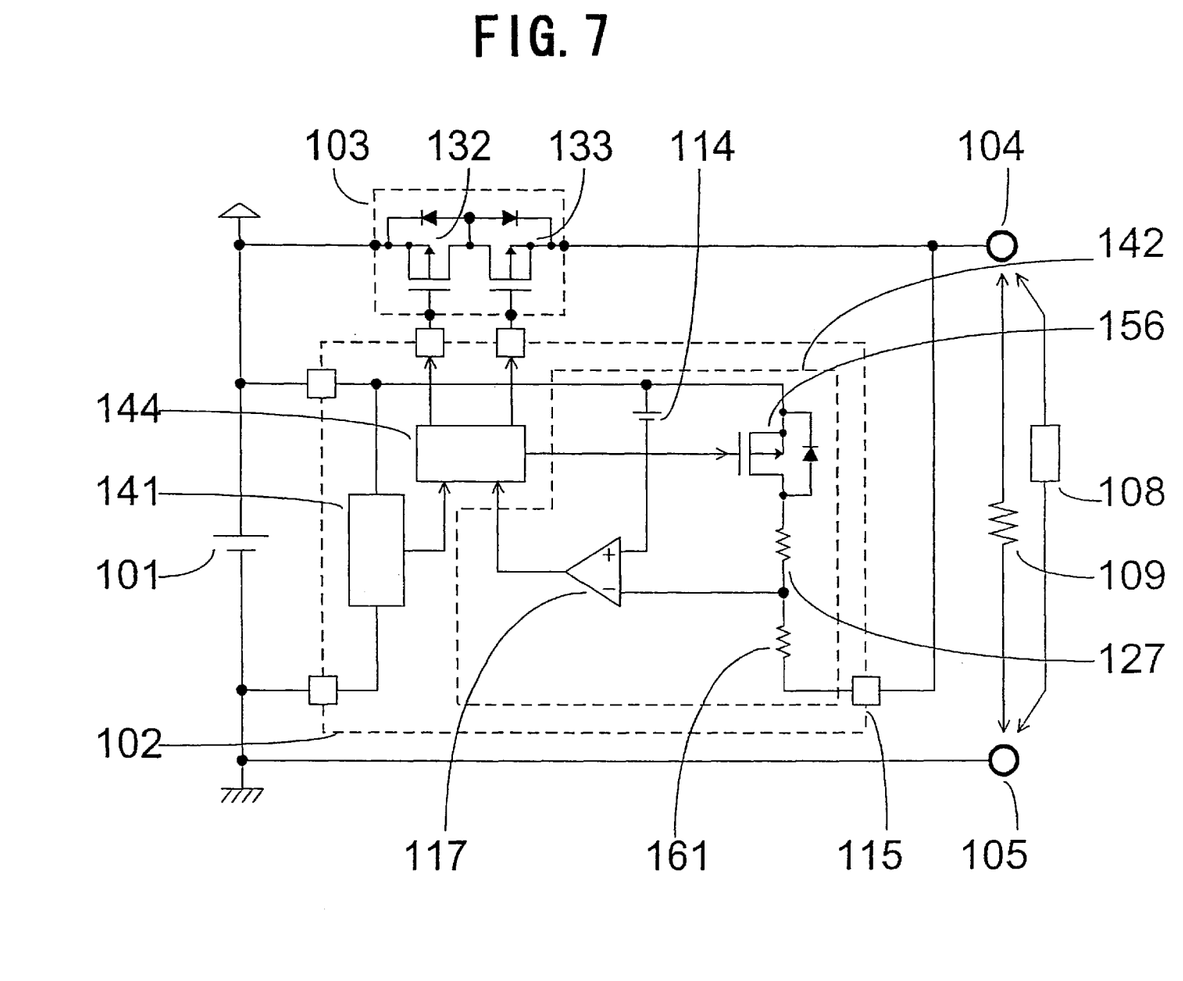
FIG. 7 is an explanatory diagram showing yet still another circuit block example of a charging type power supply device in accordance with the present invention.

FIG. 7 is an explanatory diagram showing still another circuit block example of a charging type power supply device in accordance with the present invention.

In FIG. 7, the charging type power supply device using the switching circuit 103 made up of the p-channel FETs is so changed as to be identical in structure with that of FIG. 6. It is apparent that the same operation as that of FIG. 6 is conducted.

Figure 8:
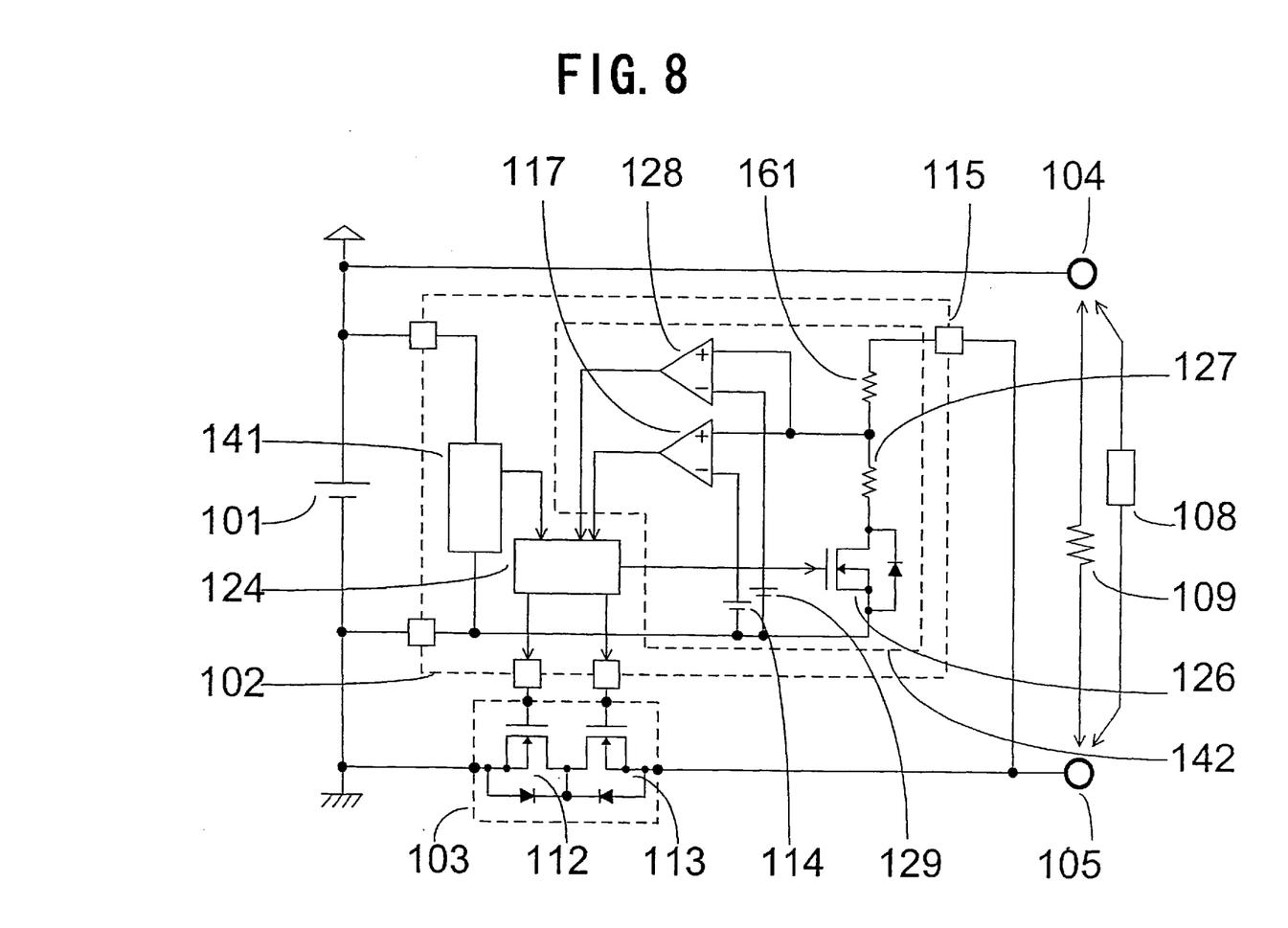
FIG. 8 is an explanatory diagram showing yet still another circuit block example of a charging type power supply device in accordance with the present invention.

FIG. 8 is an explanatory diagram showing still another circuit block example of a charging type power supply device in accordance with the present invention.

The circuit of FIG. 8 has both the functions of FIGS. 1 and 6.

Assuming that the open-circuit impedance when the load is out is Ra, the resistance of the resistor 127 is Rb, the resistance of the resistor 161 is Rc, the voltage of the secondary battery 101 is Vb, and the voltage of the reference voltage C 129 is Vc, Ra can be then represented by the following expression.

$$Ra > Rb(Vb/Vc - 1) - RC \qquad (3)$$

In this situation, the voltage of the over-current detection terminal 115, that is, the return voltage Vd from the over-current detection is represented as follows:

$$Vd < (Rb+Rc)/Rb * Vc \qquad (22)$$

In this expression, for example, assuming that Rb=136 KΩ, Rc=90 KΩ, Vb=3.5 V, and Vc=1 V, $$Ra > 136\ K\Omega(3.5\ V/1\ V-1) - 90\ K\Omega = 0.25\ M\Omega$$

$$Vd < (136\ K\Omega + 90\ K\Omega)/136\ K\Omega * 1\ V = 1.66\ V$$

As described above, because the over-current detection voltage is 0.1 V whereas the return voltage from the over-current detection is 1.66 V, even if the load open-circuit impedance is 1 MΩ or less, it is apparent that the charge/discharge control device surely returns from the over-current state to the normal state.

Also, because of Rb+RC=226 KΩ, even with the same return impedance as that of other examples, the input impedance of the over-current detection terminal 115 can be set to be high. This is effective in limiting a current that flows through a parasitic diode of the FET-C 126 by making the potential at the external terminal −V0 105 lower than the negative pole of the secondary battery when the charger 108 is connected to the charge/discharge control device in the case where the charge/discharge control circuit 102 is formed of a semiconductor integrated circuit.

Figure 9:
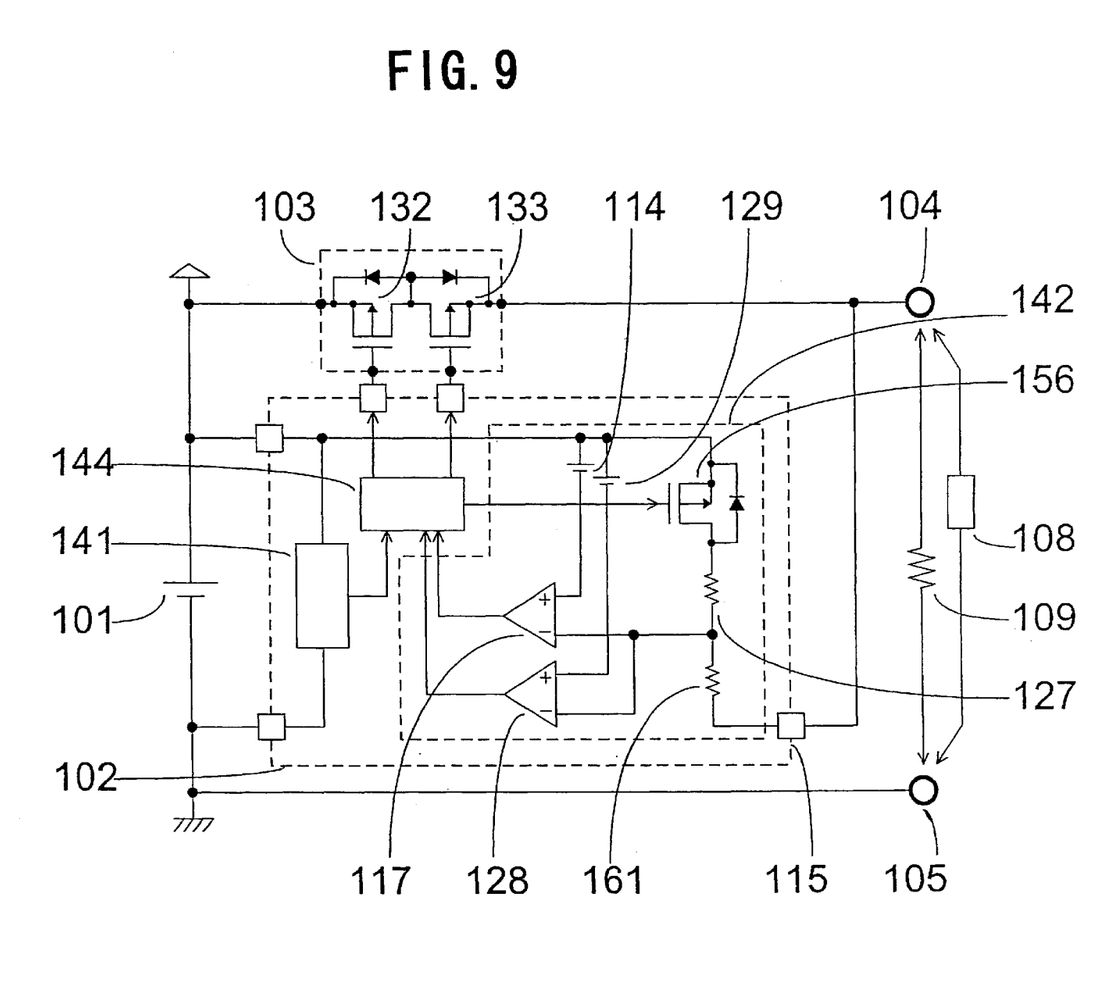
FIG. 9 is an explanatory diagram showing yet still another circuit block example of a charging type power supply device in accordance with the present invention.

FIG. 9 is an explanatory diagram showing yet still another circuit block example of a charging type power supply device in accordance with the present invention.

In FIG. 9, the charging type power supply device using the switching circuit 103 made up of the p-channel FETs is so changed as to be identical in structure with that of FIG. 8. It is apparent that the same operation as that of FIG. 8 is conducted.

Figure 10:
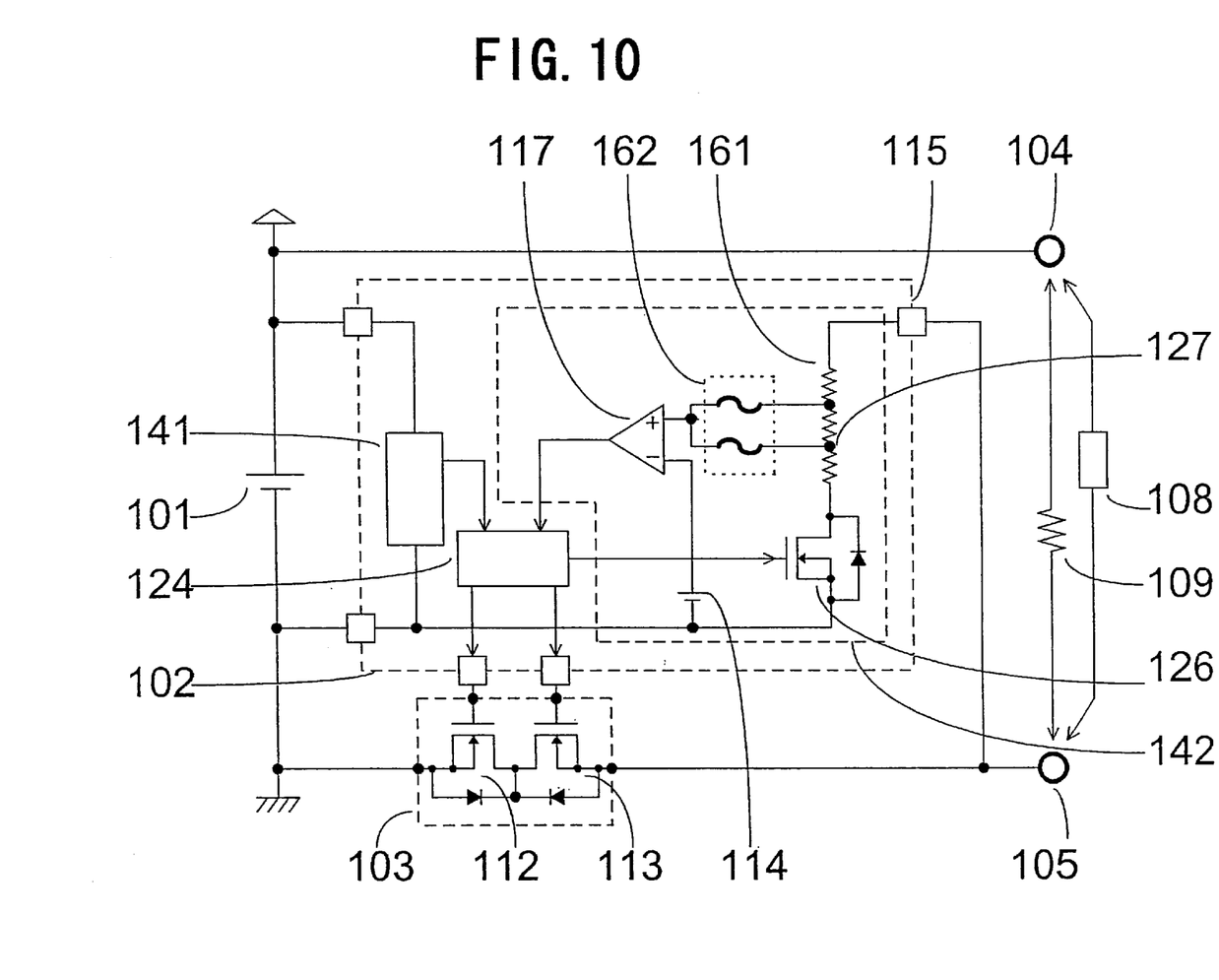
FIG. 10 is an explanatory diagram showing yet still another circuit block example of a charging type power supply device in accordance with the present invention.

FIG. 10 is an explanatory diagram showing yet still another circuit block example of a charging type power supply device in accordance with the present invention.

The circuit of FIG. 10 adds a return voltage adjusting circuit 162 to the circuit of FIG. 6. The return voltage adjusting circuit 162 is formed of, for example, a fuse, and a ratio of a resistor 127 to a resistor 161 can be arbitrarily adjusted by cutting off an arbitrary fuse, and the return voltage from the over-current detection is adjusted so as to quickly respond to requests from the various open-circuit impedances. It is needless to say that the return voltage adjusting circuit 162 can be employed in the embodiments other than the embodiment of FIG. 6.

Also, the return voltage adjusting circuit 162 can be structured by any circuit if the circuit can adjust the return voltage, and the present invention is not limited to the embodiments.

In addition, in order to enable stabilized control with respect to a transitional voltage fluctuation that occurs due to various causes including the attachment/detachment of the above-mentioned load 109 and charger 108, it is effective that a delay circuit is added to a required portion of the charge/discharge control circuit 102 of this embodiment.

For example, it an appropriate delay circuit is added since detection signal and a return signal are inputted to the output logic control circuit 124 until a signal is outputted to the FET-A 112, the FET-B 113 and the FET-C 126, very stabilized control is enabled.

The circuit of this embodiment solves the problems with the conventional circuit without adversely affecting all the environments where the secondary battery is used as described above.

The above embodiments control the charge/discharge operation of one secondary battery. However, even if a plurality of secondary batteries are connected in series, if the structure is changed so that the voltages of the respective batteries can be detected by the charge/discharge control circuit 102, the charge/discharge control device can be simply structured, and the present invention is effective in such a structure.

In this embodiment, the charge/discharge control circuit is formed of a C-MOS (complementary metal oxide semiconductor) circuit but can be structured by a bipolar transistor, and the realization is easy.

In addition, if the present invention is so structured as to have another return detection voltage different from a detection voltage for detecting over-current when the charge/discharge control device returns from the over-current detection state to the normal state, any other circuit structure can be applied, and the present invention is not limited to the above-mentioned embodiments.

As was described above, according to the present invention, even if the load is opened by a resistance equal to or lower than 1 MΩ, the charge/discharge control device surely returns from the over-current state to the normal state, to thereby improve the reliability of the products.

The foregoing description of the preferred embodiments of the invention has been presented for purposes of illustration and description. It is not intended, to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A charge/discharge control circuit for controlling current limiting means for adjusting a current in a rechargeable secondary battery and monitoring at least one of a voltage and a current of the secondary battery, the charge/discharge control circuit comprising:

overcharge detection means for detecting an overcharged state of the secondary battery and controlling the current limiting means to limit the current in the secondary battery in response thereto;

overdischarge detection means for detecting an overdischarged state of the secondary battery and controlling the current limiting means to limit the current in the secondary battery in response thereto; and overcurrent detection means for detecting an overcurrent state of the secondary battery by detecting an upper limit discharge current of the secondary battery as a first predetermined voltage when the discharge current of the secondary battery is increasing, controlling the current limiting means to limit the current in the secondary battery in response to the detected first voltage, detecting a second predetermined voltage associated with a normal state of the secondary battery when the discharge current is decreasing from the overcurrent state, and controlling the current limiting means to allow current to flow in the secondary battery in response to the detected second voltage, the second predetermined voltage having a larger magnitude than the first predetermined voltage.

2. A charge/discharge control circuit according to claim 1; wherein the overcurrent detection means includes a first detecting circuit for detecting an increase in discharge current; and a second detecting circuit for detecting a decrease in the discharge current.

3. A charge/discharge control circuit according to claim 1; wherein the overcurrent detection means includes a voltage divider circuit for dividing a voltage of the secondary battery by a predetermined ratio and outputting a divided voltage; and a detecting circuit for detecting whether the divided voltage has the first or second voltages values.

4. A charge/discharge control circuit according to claim 3; wherein the voltage divider circuit has an adjustable voltage dividing ratio.

5. A charge/discharge control circuit according to claim 3; wherein the voltage divider circuit has a trimmable fuse which may be cut to adjust the predetermined voltage dividing ratio.

6. A charge/discharge control circuit according to claim 1; wherein the overcurrent detection means comprises a voltage divider circuit for dividing a voltage of the secondary battery by a predetermined ratio and outputting a divided voltage; a detecting circuit for detecting an increase in the discharge current based on the divided voltage; and a return detecting circuit for detecting a decrease in the discharge current based on the divided voltage.

7. A charge/discharge control circuit according to claim 6; wherein the voltage divider circuit has an adjustable voltage dividing ratio.

8. A charge/discharge control circuit according to claim 6; wherein the voltage divider circuit has a trimmable fuse which may be cut to adjust the predetermined voltage dividing ratio.

9. A charging type power supply device having a rechargeable secondary battery, current limiting means for adjusting a current in the secondary battery, and a charge/discharge control circuit for monitoring the current limiting means and at least one of a voltage and a current of the secondary battery between positive and negative external connection terminals; wherein the charge/discharge control circuit comprises a charge/discharge control circuit according to claim 1.

10. A rechargeable power supply device comprising:
a rechargeable secondary battery; external connection terminals connectable to the secondary battery, to a load driven by the secondary battery, and to a charger for charging the secondary battery; a switching circuit having one or more switching elements for selectively disconnecting the secondary battery from the external connection terminals; and an overcurrent detection circuit for monitoring a current of the secondary battery by detecting a voltage of the secondary battery and controlling the switching circuit to disconnect the secondary battery from the external connection terminals when the secondary battery is in an overcurrent state, the overcurrent detection circuit detecting a first predetermined voltage as indicating the overcurrent state when the battery current is increasing and a second predetermined voltage larger than the first predetermined voltage as indicating a normal state when the battery current is decreasing from the overcurrent state.

11. A rechargeable power supply device according to claim 10; further comprising a battery state monitoring circuit for monitoring a voltage of the battery and controlling the switching circuit to disconnect the secondary battery from the external connection terminals when one of an overcharged state and an overdischarged state of the secondary battery is detected.

12. A rechargeable power supply device according to claim 10, wherein the overcurrent detection circuit controls the switching circuit to disconnect the secondary battery from the external connection terminals when the first predetermined voltage is detected while the battery current is increasing, and controls the switching circuit to reconnect the secondary battery to the external connection terminals when the second predetermined voltage is detected while the battery current is decreasing from the overcurrent state after an overcurrent state has been detected.

13. A rechargeable power supply device according to claim 10; wherein the overcurrent detection circuit comprises a first voltage detection circuit for detecting a voltage of the secondary battery and outputting a signal when the detected voltage is the first predetermined voltage, and a second voltage detection circuit for detecting the voltage of the secondary battery and outputting a signal when the detected voltage is the second predetermined voltage.

14. A charge/discharge control circuit for controlling the charging and discharging of a rechargeable secondary battery, comprising:
a current limiting circuit for limiting a current in the secondary battery; and
an overcurrent detecting circuit for detecting an overcurrent state of the secondary battery by detecting a voltage of the secondary battery, controlling the current limiting means to limit the current in the secondary battery when the detected voltage has a first predetermined value while a discharge current of the secondary battery is increasing, and controlling the current limiting means to allow current to flow in the secondary battery when the detected voltage has a second predetermined value different from the first predetermined value while the discharge current of the secondary battery is decreasing after the overcurrent state has been detected.

15. A charge/discharge control circuit according to claim 14; further comprising a battery voltage monitoring circuit for monitoring a voltage of the secondary battery and outputting a signal for controlling the current limiting circuit to stop current from flowing in the secondary battery when the monitored voltage indicates that the secondary battery is in one of an overcharged state or an overdischarged state.

16. A charge/discharge control circuit according to claim 14; wherein the overcurrent detection circuit includes a first detecting circuit for detecting an increase in discharge current of the secondary battery; and a second detecting circuit for detecting a decrease in the discharge current.

17. A charge/discharge control circuit according to claim 14; wherein the overcurrent detection circuit comprises a voltage divider circuit for dividing the detected voltage by a predetermined ratio and outputting a divided voltage; and a detecting circuit for detecting whether the divided voltage has the first or second predetermined values.

18. A charge/discharge control circuit according to claim 14; wherein the overcurrent detecting circuit comprises a voltage divider circuit for dividing the voltage by a predetermined ratio; a first detecting circuit for detecting an increase in the discharge current based on the divided voltage; and a second detecting circuit for detecting a decrease in the discharge current based on the divided voltage.

19. A charge/discharge control circuit according to claim 18; wherein the voltage divider circuit has a trimmable fuse for adjusting the voltage dividing ratio.

* * * * *